United States Patent Office 3,132,323
Patented May 5, 1964

3,132,323
MAXIMUM ALLOWABLE AIRSPEED SWITCH
Frederic Hauptman, Forest Hills, N.Y., assignor to Kollsman Instrument Corporation, Elmhurst, N.Y., a corporation of New York
Filed June 20, 1961, Ser. No. 118,460
4 Claims. (Cl. 340—27)

This invention resides broadly in the field of aircraft navigation instruments and is specifically concerned with an aircraft instrument that automatically provides a warning signal and control signal whenever the craft exceeds its maximum safe permissive speed.

More specifically, the present invention provides an instrument including a preprogrammed automatic computer linkage corresponding to the overall known characteristics of the aircraft, and being adjustable for specific variations in different aircraft, that functions in response to the speed of the craft and the static pressure of the atmosphere through which the craft is proceeding to automatically provide an indication to the pilot whenever the craft has reached or exceeded its safe speed. The indication being provided is preferably in the form of an electrical signal which may be employed to operate warning lights, audible signaling devices or the like, or may be employed as a control signal to automatically operate further control mechanisms on the craft serving to reduce the speed of the craft to within its safe or permissive speed.

The instrument increases the margin of safety in the operation of the craft by automatically performing the function of monitoring the craft speed, which function has been heretofore performed by the pilot. In the past, aircraft have been provided with allowable airspeed indicators, typically having a pair of pointers indicating the existing airspeed and the maximum allowable airspeed, which indicators must be continually observed by the pilot or copilot, along with a myriad of other control and regulating instruments, to insure that the craft is not exceeding its safe speed for the existing atmospheric conditions. According to the present invention, the pilot is fully or partially relieved of this function since the instrument can itself both warn the pilot by appropriate signals and actuate controls to automatically reduce the aircraft speed thus minimizing the possibility of human error in the safe control of the craft.

According to further features of the invention, the preferred instrument has been preprogrammed in the light of extensive flight tests made of aircraft under a complete wide range of operating conditions to simulate the general characteristics of present day jet powered and other high speed craft from takeoff to maximum altitude ceiling conditions and compute the safe operating limits of speed under each range of conditions. The computing mechanism is preferably comprised of positive acting mechanical elements and linkages to offer the utmost in reliability and safety as required for the applications intended while being sufficiently versatile to permit the necessary adjustments in the computing functions to enable the instrument to be employed with a variety of different aircraft, each of which have operating characteristics that are somewhat different from the others.

It is accordingly a principal object of the invention to provide an automatic signaling and control device for warning of and preventing an aircraft from exceeding its safe flightspeed, thus minimizing the possibility of human error.

A further object is to provide a multirange instrument of this type that more closely simulates the differing response of the craft at different altitude ranges and atmospheric conditions.

Still another object is to provide such an instrument that is versatile in application and may be easily adapted for use with different type aircraft having different flight characteristics.

A still further object is to provide such an instrument having positively acting mechanical and computing and simulating elements offering the utmost in reliability as required for its intended function.

Other objects and many additional advantages will be more readily understood by those skilled in the art after a detailed consideration of the following specification taken with the accompanying drawings wherein.

Preliminary to a detailed consideration of the structure of a preferred embodiment of the invention, it is first believed helpful to briefly consider the characteristics of a typical aircraft of the type under consideration for the purpose of more easily understanding the mode of operation of the present invention, and, specifically the manner in which the present invention determines when the craft has reached or exceeded its maximum permissive speed.

Figure 1:
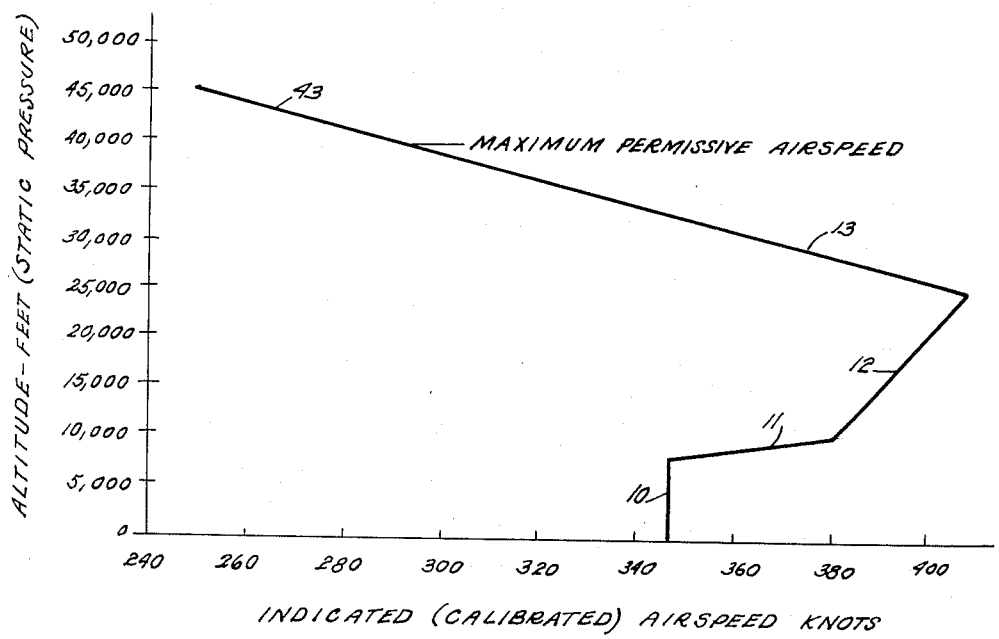
FIGURE 1 is a plotted graph generally illustrating the variation in the maximum allowable airspeed of a typical aircraft of present design at different altitudes, assuming standard atmospheric conditions.

As generally indicated in FIGURE 1, the maximum permissive speed or safe speed of the craft has been found by extensive tests to follow a discontinuous mathematic function of the static pressure of the atmosphere. Assuming standard atmospheric conditions which determine this static pressure, the maximum safe speed may be plotted as a function of the altitude, as shown. Referring to FIGURE 1, it is noted that in a first range 10 of low altitudes corresponding to the higher atmospheric pressure at ground and close to ground, and extending from takeoff to about 7000 feet, the maximum speed of the craft remains substantially constant and should not exceed 340 airspeed knots over this full range whereas during the next higher range of altitudes indicated at 11 and from about 7000 to 10,000 feet, the craft may safely increase its maximum speed progressively at higher altitudes from 340 knots to about 380 knots at 10,000 feet due primarily to the reduction in static pressures in this altitude range. As the craft continues to ascend in the altitude range 12 corresponding to the range from 10,000 feet to 25,000 feet, the maximum speed may also be progressively increased with safety due to further reductions in the static pressure of the atmosphere from about 380 knots to somewhat over 400 knots but at a much slower rate than in the preceding range 11 due to other effects taking place. However, when the craft reaches an altitude of about 25,000 feet and ascends to its maximum ceiling of 45,000 feet in the range indicated as 13 in FIGURE 1, the trend reverses, and the craft must progressively reduce its speed, as shown, with further reductions in pressure within this range.

It is to be understood, that the plotted curve of FIGURE 1 is merely representative of many present day aircraft designs but that the altitude ranges, permissive speeds, and rate of speed variations within each range will vary for different aircraft. It is also to be understood, that although FIGURE 1 illustrates the maximum safe speed of the craft to be a function of the altitude and altitude range, the safe speed is in reality a multirange function of the static atmospheric pressure and consequently variations in the temperature and other atmospheric conditions affecting the static pressure are taken into account in determining the maximum safe speed.

According to the present invention, there is provided an instrument that includes a simulator or computing mechanism for reproducing the multirange mathematical function shown in FIGURE 1 to essentially determine the safe speed at each different static pressure of the atmosphere through which the craft is proceeding. This safe speed computation is continually compared with the existing airspeed which is also being continuously measured and when the existing craft speed reaches within a specified range of the safe speed, the instrument automatically provides a signal for warning the pilot or automatically controlling the craft as is desired.

Figure 2:
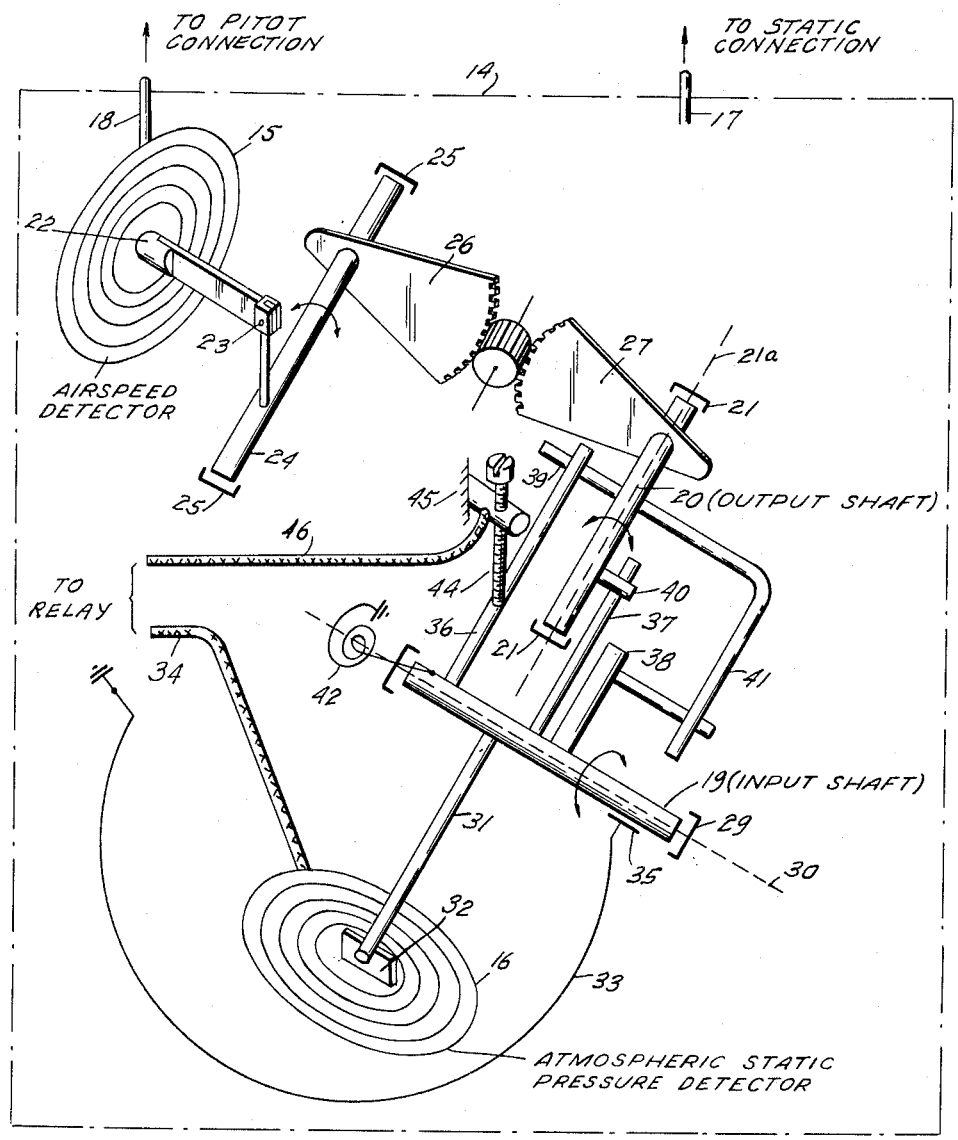
FIGURE 2 is a perspective view illustrating one preferred embodiment of the invention.

Referring now to FIGURE 2, the preferred instrument includes within an outer housing 14, the two detectors mentioned, comprising an airspeed detector 15 and an atmospheric static pressure detector 16. The static pressure detector 16 is preferably a sealed unit and consequently expands or contracts proportionately to the pressure existing within housing 14. The housing 14 is provided with an outlet, such as 17, providing a pressure therein proportional to the static pressure of atmosphere. The airspeed detector 15 on the other hand is internally connected by means of a tube 18 or the like to a Pitot tube (not shown) on the aircraft to internally receive the total pressure proportional to the sum of aircraft speed and static pressure whereas externally, this detector 15 is subjected to static atmospheric pressure within housing 14. The net result is that detector 15 expands or contracts in proportion to the airspeed of the aircraft, since the static pressure externally cancels the internal static pressure.

For automatically determining when the airspeed of the craft reaches or tends to exceed its safe speed, there is provided intermediate the two detectors 15 and 16, a multiratio drive linkage type computer that serves to continuously determine whether the existing speed of the craft as determined by the displacement of the speed detector 15 lies within the safe speed as determined by the mathematical function of the displacement of the static pressure detector 16.

The mechanism interconnecting an input shaft 19 and an output shaft 20, with the mechanism being programmed to provide the discontinuous mathematical function as shown in FIGURE 1, corresponding to the characteristics of the aircraft in which it is employed.

If the input shaft 19 were connected to be displaced by the static pressure detector 16, then the output shaft 20 would be displaced according to the discontinuous function of FIGURE 1, and the displaced position of shaft 19 at any given time would provide an indication of the maximum permissive or safe speed of the aircraft. The displacement of output shaft 20 would, in turn, then be compared with the actual airspeed as indicated by the displacement of the airspeed indicator 15 and if the actual airspeed reached or approached within a given limit of the safe speed, a warning signal would be produced to signal the pilot or control the aircraft to reduce its speed.

According to the present invention, however, it is preferred that the connections be reversed and that the output shaft 20 be operatively connected to the airspeed detector diaphragm 15, whereby the discontinuous function linkage is driven in the reversed direction. In this instance, the input shaft 19 is not operatively connected to be driven by the static pressure detector 16 but instead will be positioned independently thereof by displacement of the output shaft 20. The result is, however, the same since whenever the input shaft 19 is positioned through the function linkage to operatively engage the static pressure detector 16, it is evident that the actual airspeed has approached within the danger zone of the safe operating speed and the instrument provides the warning signal as desired.

Specifically considering details of the preferred discontinuous function linkage construction, the output shaft 20 of the linkage is rotatably mounted by means of suitable bearings 21 to rotate about axis 21a. This shaft 20 is operatively connected to the airspeed diaphragm 15 and adapted to be rotatably and reversibly displaced by expansion and contraction of the diaphragm 15 by means of a crank arm 22 suitably connected to the diaphragm 15 and driving a rocking shaft 24 about its bearing 25 which, in turn, angularly displaces a sector gear 26 that serves to positively drive a second sector gear 27 connected to the output shaft 20, as shown.

The input shaft 19 of the discontinuous function linkage being rotatably supported by bearings, such as 29, is thus rotatably displaced about its central axis 30 corresponding to the discontinuous function shown in FIGURE 1, and movement of input shaft 19 positions an outstanding arm 31 connected thereto along an upward arc or downward arc according to the direction of rotation of the input shaft 19. The arm 31 connected to the input shaft 19 is adapted to overlie a bar 32 supported along the central axis of the static pressure diaphragm 16 whereby the arm 31 may be positioned toward or away from the bar 32 depending upon the direction of rotation of the input shaft 19. As will be recalled, the static pressure diaphragm 16 is also being independently displaced upwardly and downwardly toward and away from the arm 31 in proportion to the static pressure of the atmosphere. Consequently, whenever the actual flight-speed of the craft approaches the predetermined limits of safe flying speed, the arm 31 is brought into contact with the bar 32 on the static pressure detector, indicating that the craft is in danger and its speed should be reduced.

To provide for the generation of an electrical signal whenever such contact is made between arm 31 and insulated bar 32, a pair of electrical connectors 33 and 34 may be provided, with connector 34 making contact with the static pressure detector 16 and connector 33 being appropriately connected by reason of the fact that hair spring 42 makes the required ground connection. With these electrical connections, whenever arm 31 is brought into contact with bar 32, an electrical connection or short circuit is made between connectors 33 and 34 which may establish an energized connection to operate warning lights, an audible buzzer, relays or other warning or control device as are well known in the art.

The discontinuous function linkage interconnecting the input shaft 19 and output shaft 20 may be any desired mechanical linkage providing the discontinuous mathematical function shown in FIGURE 1 that is positive acting, reliable in operation, and adjustable for use with different aircraft.

As shown in FIGURE 2, the preferred mechanism generally comprises a plurality of pairs of lever arms that are adapted to engage one another in sequence with continued displacement of the output shaft 20 to provide a positive drive connection between the input and output shafts 19 and 20. Each of the pairs of lever arms provides a different one of the ranges 11, 12 and 13 of FIGURE 1, whereby, for example, in response to an initial displacement of the output shaft 20, the coupling between the input and output shafts 19 and 20 may be in the ratio shown in the range 11 of FIGURE 1 until continued displacement of shaft 20 in the same direction brings a second pair of lever arms into engagement to provide the next drive ratio, indicated as range 12 in FIGURE 1. In a similar manner, a displacement of output shaft 20 in the reversed direction will ultimately bring a preceding linkage into engagement corresponding to range 13 in FIGURE 1. In range 10, as shown, the maximum air speed remains substantially constant with variation of the static pressure.

Returning to FIGURE 2 for a more detailed consideration of the preferred structure involved, the input shaft 19 is provided with a plurality of outstanding lever arms of different length shown as 36, 37 and 38 and the output shaft 20 is likewise provided with lever arms 39, 40 and 41, with each of the input shaft lever arms adapted to mate with a different one of the output shaft arms over a different range of displacement of the input and output shafts 19 and 20. Each of the pairs of different length lever arms provides a different drive ratio between the input and output shafts corresponding to the different ranges 10, 11, 12 and 13 in FIGURE 1. For example, considering range 11 in FIGURE 1, it is noted that a relatively small change in static pressure corresponding to an altitude change of from 3000 to 10,000 feet enables a relatively large change in safe airspeed to be made corresponding to from 340 knots to 380 knots. Consequently, for providing this ratio, the lever arm 37 connected to input shaft 19 is made much longer than its mating arm 40 being connected to output shaft 20 thereby to provide the drive ratio desired over the range 11.

For reversing the relative direction of rotation of the input and output shafts 19 and 20 over the range 13 of FIGURE 1, the location of the lever arms 36 and 39 are on the opposite side of the axis of rotation of the output shaft 20 whereby when these arms enter into engagement with one another, the direction of displacement of the input shaft 19 with continued displacement of the output shaft 20 is reversed to simulate the negative slope ratio curve 13 in FIGURE 1.

According to the invention, the relative length of the lever arms may be adjustably varied on the input and output shafts 19 and 20 to correspondingly vary the drive ratios as desired to meet the varying characteristics of different aircraft, and the angular positions at which each pair of lever arms enters into engagement may also be varied to extend or diminish any of the ranges 11, 12 and 13 of FIGURE 1 as required for different aircraft. Furthermore, if flight data on the aircraft demonstrate that any of the functions 11, 12 or 13 in FIGURE 1 are non-linear rather than linear, that pair of lever arms may be replaced by a suitable cam and follower arrangement (not shown) providing the non-linear function desired, with the cam being connected for displacement by either the input or output shafts 19 or 20 and the follower being connected for displacement by the other shaft.

To always maintain the input shaft 19 in engagement with the output shaft 20 through a different pair of lever arms, the input shaft 19 is spring biased by a coil spring 42, or the like, whereby a different one of its arms will always be urged against its mating arm on the output shaft 20. Spring 42 at the same time makes electrical ground contact.

Thus in the manner generally described above, there is provided a discontinuous function linkage for interconnecting the airspeed detector 15 and the static pressure detector in such manner as to simulate the maximum "safe" speed characteristics of an aircraft over a complete range of operating conditions and to provide an electrical signal when the maximum permissive speed has been reached or approached. This function linkage is variably adjustable both in the individual functions produced in each range as well as in the extent of each range, all for the purpose of enabling its application and adjustment to the differing characteristics of different aircraft.

In addition to providing an electrical signal whenever contact is made between the arm 31 and the static pressure detector 32, thereby signaling that the craft has exceeded its safe speed for a given condition of atmospheric static pressure, it is also desired to provide a warning signal or control signal whenever the craft reaches predetermined altitudes and constant airspeed such as is indicated at location 10 in the curve of FIGURE 1. To perform this function, there is provided an adjustable stop screw member 44 that is threadably received in a support 45 attached to the housing 14. The base of stop screw 44 overlies a lever arm 36 of the discontinuous function linkage to prevent further displacement of the lever 36 and rotation of the input shaft 19 when a preset combination of airspeed and altitude (or static pressure) condition prevails. Connected to the support 45, there is provided an electrical connector 46 whereby whenever contact is made between the stop screw 44 and lever 36 an electrical connection is established between cable 46 and the common wire 33 as previously described. Cable 46 and cable 34 are in parallel and both are connected to the same relay terminal. By suitably energizing the cable 46 by means of an electrical potential (not shown) the electrical connection established on contact of these members permits the generation of an electrical signal for actuating a control relay, warning buzzer, or the like, for controlling the craft and/or signaling the pilot.

Although but one preferred embodiment of the invention has been illustrated and described, it is believed evident that many variations may be made without departing from the spirit and scope of the invention. Accordingly, this invention is to be considered as being limited only by the following claims appended hereto.

What is claimed is:

1. In an aircraft instrument for producing an electrical signal responsive to the craft approaching its maximum permissible speed, an atmospheric static pressure detector, an airspeed detector, and a discontinuous function linkage interconnecting said airspeed detector and said atmospheric static pressure detector when the aircraft approaches its maximum permissive speed, to produce an electrical signal; said linkage comprising a first member being actuated by one of said detectors, a second member being driven with actuation of said first member according to a discontinuous function relating maximum permissive speed of the craft to the static pressure of the atmosphere thereby to simulate the characteristics of the aircraft and a plurality of pairs of lever arms having different drive ratios; one arm of each of said pairs being operatively connected for movement with said first member; the other arm of each of said pairs being operatively connected for movement with said second member, said different pairs of arms being disposed with respect to one another to sequentially engage over given ranges of displacement of said first member thereby to provide different drive ratios between said members for different ranges of displacement of said first and second members.

2. In the aircraft instrument of claim 1, said lever arms in each of said pairs being relatively adjustable in length to individually vary the drive ratio between said first and second member within each range; said pairs of arms being relatively adjustable to vary the range of displacement of said first member over which each pair of arms engage one another.

3. In an aircraft instrument for providing an electrical signal whenever the craft approaches its maximum permissive speed, a static pressure atmosphere detector having a displaceable member, an airspeed detector having a displaceable member, a mechanism having an input and an output member that are relatively displaceable with respect to one another at different rates over different ranges of displacement corresponding to the discontinuous function relating to the maximum safe speed of the craft to the static pressure of the atmosphere, means connecting said mechanism for actuation by one of said detectors, and electrical connection means for producing an electrical signal when the displacement of said mechanism actuated by its connected detector corresponds to the displacement of the other detector; and additional electrical signal producing means responsive to said mechanism for producing a signal whenever said aircraft reaches a predetermined speed-pressure condition; said mechanism including a plurality of pairs of lever arms having a different ratio of length in the arms of each pair, one arm of each of said pairs being supported by said input member and the other arm of each of said pairs being supported by said output member, said pairs of arms being adapted to successively engage and disengage with continued independent displacement of one of said input and output members thereby to positively drive at different ratios for different ranges of independent displacement of said member.

4. In the aircraft instrument of claim 3, the ratio of length of each of said pairs of lever arms being adjustable to vary the drive ratio, and said pairs of arms being adjustable with respect to one another to vary range of engagement and disengagement thereof.

References Cited in the file of this patent

UNITED STATES PATENTS

| | | |
|---|---|---|
| 2,497,431 | Beman | Feb. 14, 1950 |
| 2,682,768 | White | July 6, 1954 |
| 2,814,688 | Kutzler | Nov. 26, 1957 |
| 2,923,153 | Westman | Feb. 2, 1960 |